United States Patent
Dai et al.

(10) Patent No.: US 10,284,829 B2
(45) Date of Patent: May 7, 2019

(54) WHEEL ASSEMBLY WITH THERMAL CONDUCTIVE ASSEMBLY AND PROJECTION DEVICE USING THE SAME

(71) Applicant: Coretronic Corporation, Hsin-Chu (TW)

(72) Inventors: Jia-Hong Dai, Hsin-Chu (TW); Te-Ying Tsai, Hsin-Chu (TW); Tsung-Ching Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/152,224

(22) Filed: May 11, 2016

(65) Prior Publication Data
US 2017/0026624 A1    Jan. 26, 2017

(30) Foreign Application Priority Data
Jul. 21, 2015   (TW) .............................. 104123562 A

(51) Int. Cl.
*G03B 21/16*    (2006.01)
*H04N 9/31*    (2006.01)
*G02B 26/00*    (2006.01)

(52) U.S. Cl.
CPC ......... *H04N 9/3144* (2013.01); *G02B 26/008* (2013.01); *G03B 21/16* (2013.01); *H04N 9/3111* (2013.01)

(58) Field of Classification Search
CPC .... H04N 9/3144; H04N 9/3114; G03B 21/16; G02B 26/008; F21S 10/007
See application file for complete search history.

(56) References Cited

U.S. PATENT DOCUMENTS

| | | | |
|---|---|---|---|
| 4,046,190 A | 9/1977 | Marcus et al. | |
| 6,618,213 B2* | 9/2003 | Inamoto | F04D 17/08 348/743 |
| 6,755,554 B2* | 6/2004 | Ohmae | F21S 10/007 348/743 |
| 7,018,051 B2* | 3/2006 | Bok | G03B 21/16 348/743 |

(Continued)

FOREIGN PATENT DOCUMENTS

| | | |
|---|---|---|
| CN | 203643734 U | 6/2014 |
| CN | 104516178 A | 4/2015 |

(Continued)

*Primary Examiner* — Bao-Luan Q Le

(57) ABSTRACT

A wheel assembly includes a housing, a wheel, and a thermal conductive assembly. The wheel is disposed inside of an enclosure of the housing, and includes a first surface, a second surface, and a wavelength conversion layer formed on a coating area of the first surface and configured to convert wavelength of a light beam. The thermal conductive assembly includes a thermal conductive structure and a thermal conductive tube. The thermal conductive structure corresponds to an edge contour of the wheel and is disposed adjacent to an outer edge of the wheel. The thermal conductive tube is coupled to the thermal conductive structure and partially protrudes to an exterior of the housing for conducting heat generated by the wheel from the thermal conductive structure to the exterior of the housing. The distance between the thermal conductive structure and the outer edge of the wheel falls within 1-50 mm.

20 Claims, 12 Drawing Sheets

(56) References Cited

U.S. PATENT DOCUMENTS

| | | | | |
|---|---|---|---|---|
| 7,914,152 B2* | 3/2011 | Li | | G03B 21/16 313/35 |
| 8,678,597 B2* | 3/2014 | Nishimura | | G03B 21/16 353/119 |
| 9,395,607 B2* | 7/2016 | Mikutsu | | G03B 21/142 |
| 9,442,351 B2* | 9/2016 | Lin | | G03B 21/16 |
| 9,497,430 B2* | 11/2016 | Miyazaki | | H04N 9/3114 |
| 9,503,700 B2* | 11/2016 | Dai | | H04N 9/3158 |
| 2002/0003704 A1* | 1/2002 | Ohmae | | F21S 10/007 362/293 |
| 2002/0180938 A1* | 12/2002 | Bok | | G03B 21/16 353/52 |
| 2003/0095349 A1* | 5/2003 | Inamoto | | F04D 17/08 359/889 |
| 2004/0095767 A1* | 5/2004 | Ohmae | | F21S 10/007 362/293 |
| 2009/0034105 A1* | 2/2009 | Ho | | G02B 26/008 359/892 |
| 2009/0073591 A1* | 3/2009 | Chou | | G02B 26/008 359/892 |
| 2009/0195756 A1* | 8/2009 | Li | | G03B 21/16 353/54 |
| 2011/0019161 A1* | 1/2011 | Chen | | G03B 21/16 353/61 |
| 2011/0115353 A1 | 5/2011 | Domenig et al. | | |
| 2012/0013854 A1* | 1/2012 | Nishimura | | G03B 21/16 353/57 |
| 2013/0169938 A1* | 7/2013 | Huang | | G03B 21/16 353/31 |
| 2014/0307232 A1* | 10/2014 | Sato | | G03B 21/16 353/31 |
| 2014/0362352 A1* | 12/2014 | Mikutsu | | G03B 21/142 353/84 |
| 2015/0092164 A1* | 4/2015 | Lin | | G03B 21/16 353/57 |
| 2015/0229892 A1* | 8/2015 | Dai | | H04N 9/3158 353/31 |
| 2016/0291449 A1* | 10/2016 | Masuda | | G03B 21/16 |
| 2017/0052434 A1* | 2/2017 | Masuda | | G03B 21/16 |

FOREIGN PATENT DOCUMENTS

| | | |
|---|---|---|
| JP | 3726655 B2 | 12/2005 |
| JP | 2014-112696 A | 6/2014 |
| TW | 200536463 A | 11/2005 |
| TW | 200624989 A | 7/2006 |
| TW | M315856 U | 7/2007 |
| TW | 200907546 A | 2/2009 |
| TW | 200916938 A | 4/2009 |
| TW | 201441751 A | 11/2014 |
| TW | I461632 B | 11/2014 |
| TW | 201525604 A | 7/2015 |
| WO | 2010116444 A1 | 10/2010 |

* cited by examiner

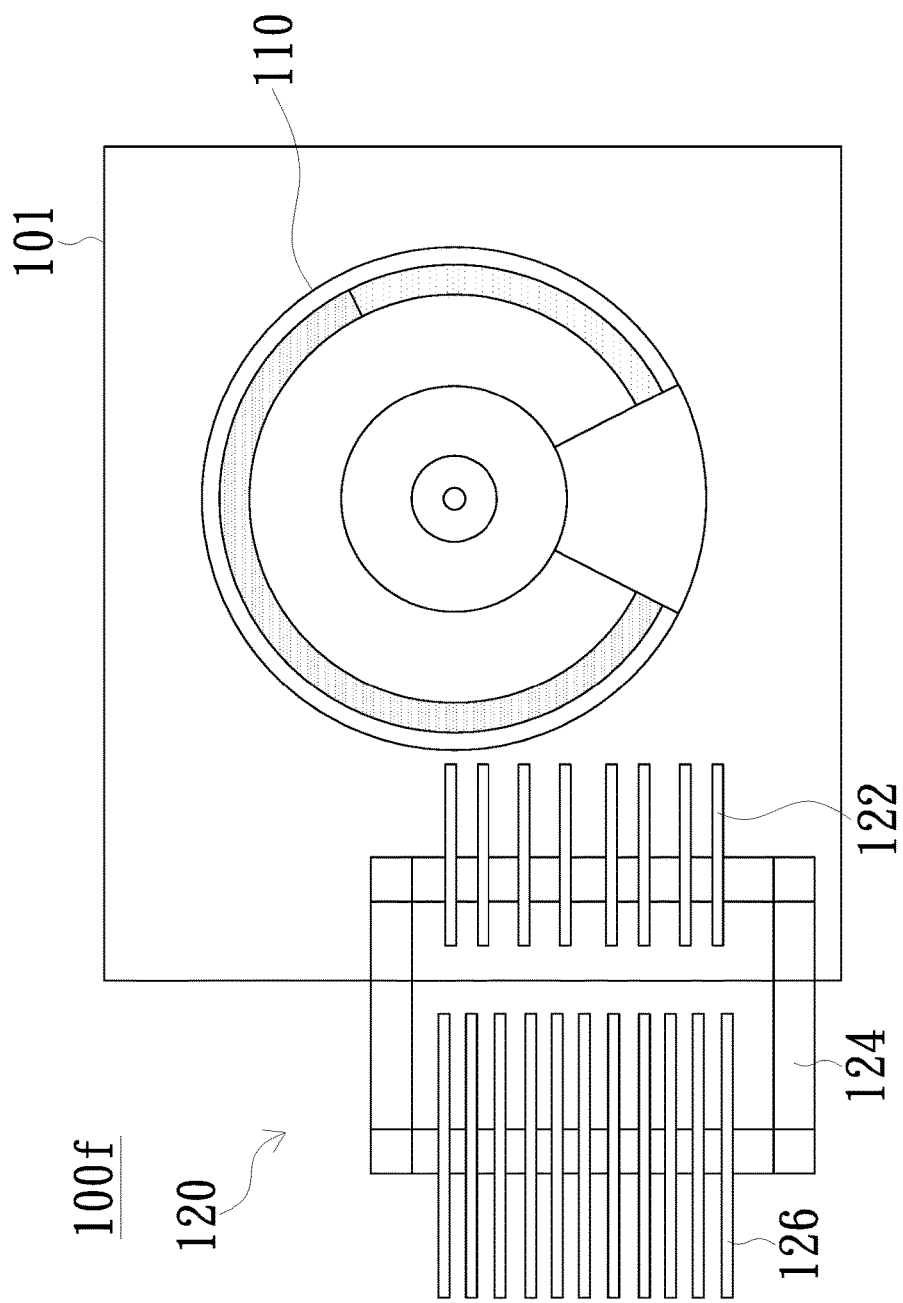

WHEEL ASSEMBLY WITH THERMAL CONDUCTIVE ASSEMBLY AND PROJECTION DEVICE USING THE SAME

FIELD OF THE INVENTION

The invention relates to a projection device, and more particularly to a projection device having a wheel assembly.

BACKGROUND OF THE INVENTION

A projection device is a common image display device and has been extensively utilized for living entertainments, academic presentations, and business demonstrations. According to the principles of display, projection devices can be categorized into cathode-ray tube (CRT), liquid crystal display (LCD), digital light processing (DLP), and liquid crystal on silicon (LCoS) based projection devices.

DLP projectors modulate light beams emitted from its light source by a digital micro-mirror device (DMD). DLP projector projects images onto a projection screen via an optical projection system. Single or dual light valves of the projector utilizes wheel assembly to filter some colors from the light source and thus display another colors. Preferably, the wheel assembly is designed to project images with wide color gamut, high brightness, and ideal white balance.

A standard wheel assembly is comprised of phosphor powder in the surface of the wheel. The area of light exposure of the phosphor powder coated on the wheel would increase with rotation of the wheel. However, dust particles may adhere to the phosphor powder during wheel rotation, causing reduction in optical efficiency of the phosphor powder. Consequently, most wheel assemblies are disposed inside of an enclosed housing to prevent dusts. However, excessive thermal energies would be generated from energy loss occurred during light conversion and from the motor driving the wheel to rotate, thus causing elevated temperature inside of the housing and reduced optical efficiency due to overheated phosphor powder. Meanwhile, adhesives for coating the phosphor powder are generally weakly resistant to heat; therefore, the adhesives may potentially be burned when the housing is overheated from the inside.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention provides a wheel assembly, so as to provide a solution to the existing technical challenges.

An embodiment of the invention provides a wheel assembly, including a housing, a wheel, and a thermal conductive assembly. The housing has an enclosure. The wheel is disposed inside of the enclosure of the housing, and includes a first surface, a second surface, and a wavelength conversion layer. The first surface forms a coating area; the second surface is opposite to the first surface; and the wavelength conversion layer is formed on the coating area of the first surface and configured to convert wavelength of a light beam. The thermal conductive assembly includes a thermal conductive structure and a thermal conductive tube. At least partial of the thermal conductive structure corresponds to the edge contour of the wheel and is disposed adjacent to the outer edge of the wheel. The thermal conductive tube is coupled to the thermal conductive structure, and at least partial of the thermal conductive tube protrudes to the exterior of the housing for conducting heat generated by the wheel from the thermal conductive structure to the exterior of the housing. The distance between the thermal conductive structure and the outer edge of the wheel falls within a range of 1 mm to 50 mm.

Another embodiment of the invention provides a projection device. The projection device includes a light emitter, a wheel assembly, a driver, a light valve, and a projection lens. The light emitter is configured to emit a light beam. The wheel assembly is disposed on the transmission path of the light beam, and includes a housing, a wheel, and a thermal conductive assembly. The housing has an enclosure. The wheel is disposed inside of the enclosure of the housing, and includes a first surface, a second surface, and a wavelength conversion layer. The first surface forms the first surface; the second surface is opposite to the first surface; and the wavelength conversion layer is formed on the coating area of the first surface and configured to convert wavelength of the light beam. The thermal conductive assembly includes a thermal conductive structure and a thermal conductive tube. At least partial of the thermal conductive structure corresponds to the edge contour of the wheel and is disposed adjacent to the outer edge of the wheel. The thermal conductive tube is coupled to the thermal conductive structure, and at least partial of the thermal conductive tube protrudes to the exterior of the housing for conducting heat generated by the wheel from the thermal conductive structure to the exterior of the housing. The distance between the thermal conductive structure and the outer edge of the wheel falls within a range of 1 mm to 50 mm. The driver is assembled to the wheel of the wheel assembly and configured to drive the rotation of the wheel. The light valve is disposed on the transmission path of the light beam and configured to modulate the light beam converted by the wavelength conversion layer into an image bearing light beam. The projection lens is disposed on the transmission path of the image bearing light beam so as to project the image bearing light beam.

The wheel assembly of the projection device of the embodiments of the invention has a thermal conductive assembly disposed adjacent to the outer edge of the wheel, so that energy generated from light conversion loss and heat generated during rotation of the wheel of the wheel assembly may be conducted to the thermal conductive assembly along with the airflow flowing away from the wheel. The energy and heat are then conducted to the exterior of the housing of the wheel assembly via the thermal conductive tube of the thermal conductive assembly, so as to lower the temperature at the interior of the housing of the wheel assembly and thus the temperature around the wheel.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which:

FIG. 11A is a schematic illustration of another embodiment of the wheel assembly of the projection device according to FIG. 1.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be locationed in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
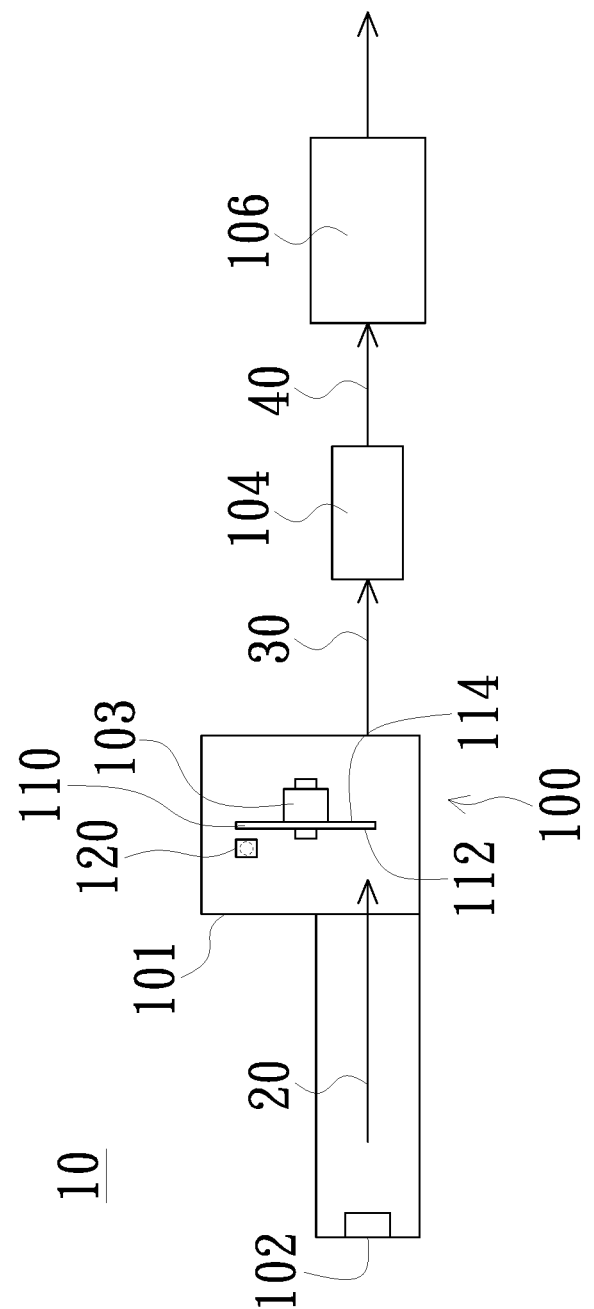
FIG. 1 is a schematic illustration of a projection device according to an embodiment of the invention.

Referring to FIG. 1, which illustrates a projection device according to an embodiment of the invention. As shown in FIG. 1, the projection device 10 includes a wheel assembly 100, a light emitter 102, a driver 103, a light valve 104, and a projection lens 106. A light beam 20 emitted by the light emitter 102 and converted by the wheel assembly 100 and the light valve 104 can pass through the projection lens 106 and be projected by the projection lens 106 onto a display surface (not shown in figure) outside of a projection device 10. In this embodiment, the light emitter 102 may be a light emitting diode, a laser diode, a high-pressure mercury vapor lamp, or other suitable light source for providing the light beam 20. For example, the light emitter 102 may be, but not limited to, a blue-ray laser diode.

Meanwhile, the wheel assembly 100 is disposed on the transmission path of the light beam 20. The wheel assembly 100 may convert wavelength of a portion of the light beam 20 into a wavelength converted light beam; the other portion of the light beam 20 and the wavelength converted light beam are then mixed into a mixed light beam 30. In other words, wavelength of a portion of the light beam 20 emitted by the light emitter 102 is converted by the wheel assembly 100 to form a mixed light beam 30.

The driver 103 can be assembled to the wheel 110 of the wheel assembly 100 for driving the rotation of the wheel 110. For example, the driver 103 may be coupled to the wheel 110 by an adhesive (not shown) or other suitable binding means, and may drive the wheel 110 to rotate clockwise or counterclockwise. In this embodiment, the driver 103 may be, but not limited to, a motor. Additionally, the driver 103 may drive the wheel 110 to rotate at a speed of up to 7,200-10,800 rpm; however, the invention is not limited thereto.

The light valve 104 may be a digital micromirror device (DMD), a liquid crystal on silicon (LCoS), or other suitable components. As the light valve 104 is disposed on the transmission path of the mixed light beam 30, the mixed light beam 30 formed by a portion of the light beam 20 being converted by the wheel assembly 100 would be modulated by the light valve 104 into an image bearing light beam 40. The image bearing light beam 40 is projected by the projection lens 106 disposed on the transmission path of the image bearing light beam 40 onto a display surface, such as a projection screen or a wall (not shown), for users to view.

It is to be understood that the quantity and position of the wheel assembly 100 of the embodiment are merely exemplary and are in no way intended to limit the invention. In this embodiment, other optical components may also be disposed on the transmission path between the light emitter 102 and the light valve 104; suitable optical components may include a lens, a reflective mirror, an integrator rod, and an optical splitter. Furthermore, an aperture or other suitable optical components may also be disposed within the projection lens 106; but the invention is not limited thereto.

Figure 2:
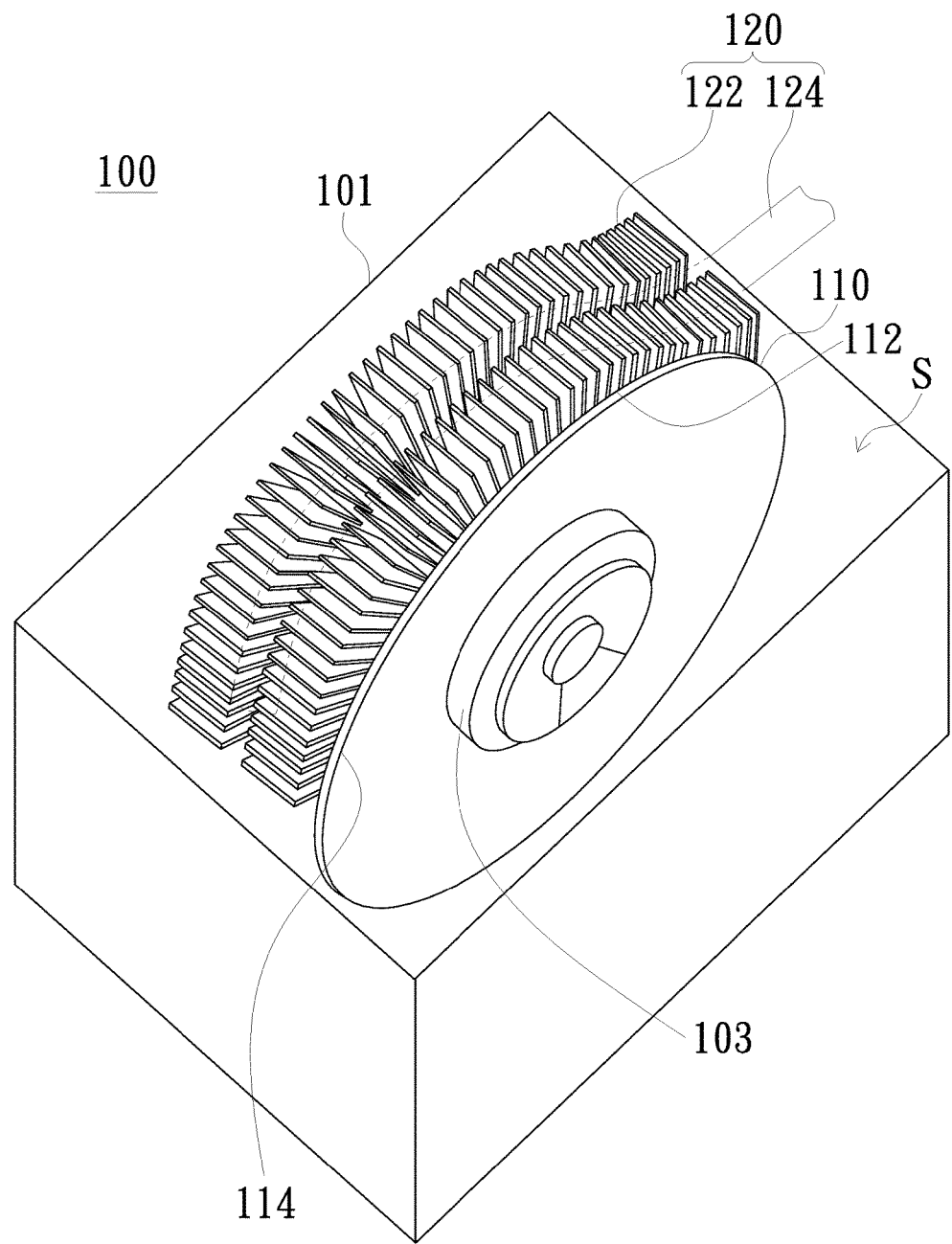
FIG. 2 is a schematic illustration of a three dimensional view of the wheel assembly of the projection device according to FIG. 1.
Figure 3:
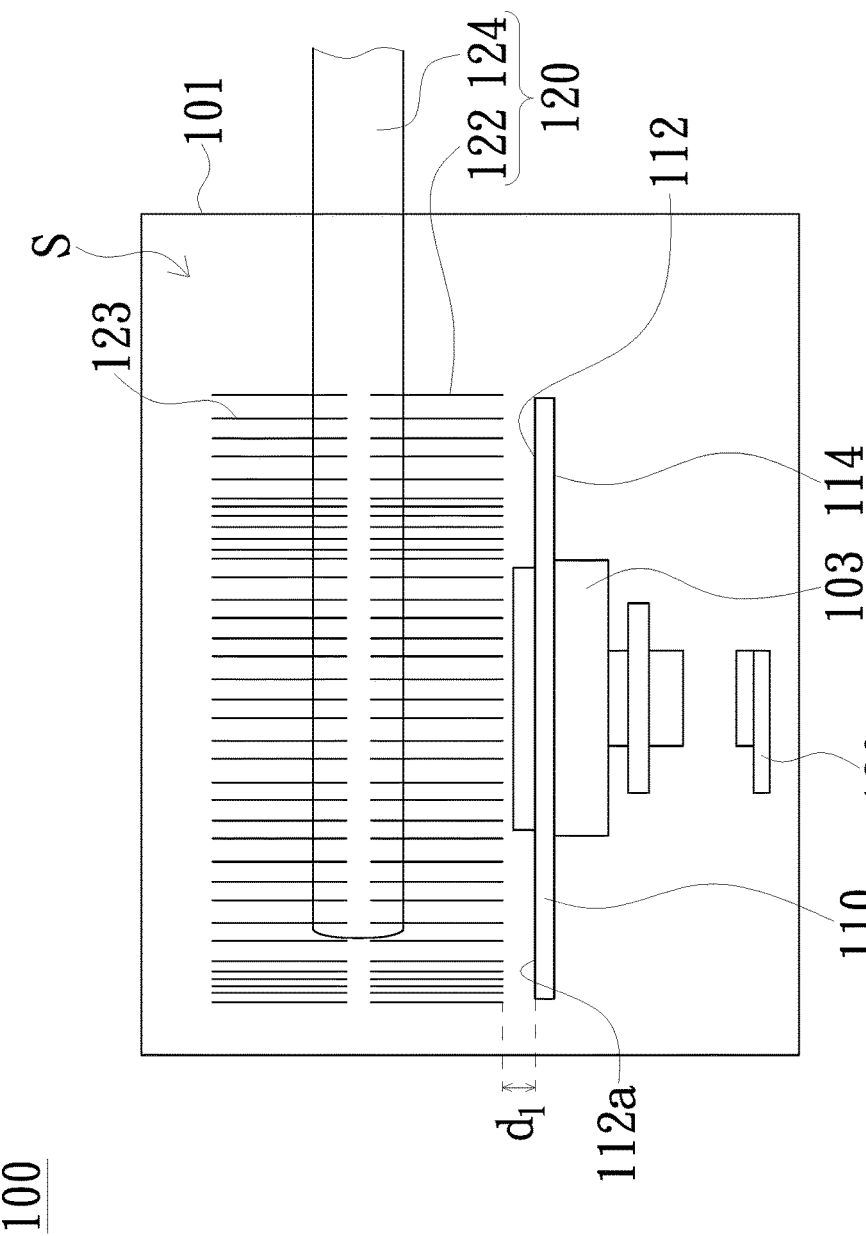
FIG. 3 is a schematic illustration of a top view of the wheel assembly of the projection device according to FIG. 1.
Figure 4:
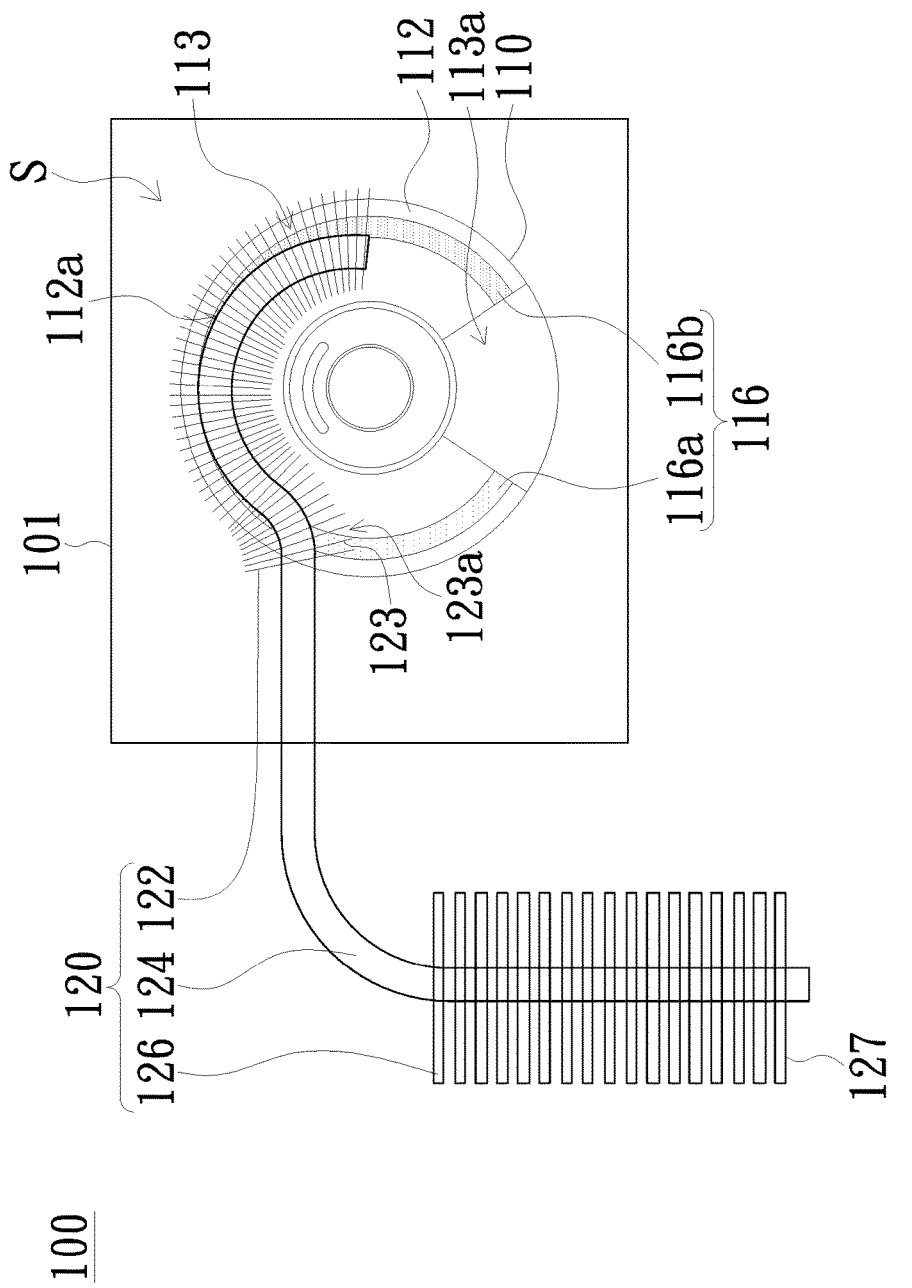
FIG. 4 is a schematic illustration of a side view of the wheel assembly of the projection device according to FIG. 1.

Referring to FIGS. 2-4. FIG. 2 illustrates a three dimensional view of the wheel assembly of the projection device according to FIG. 1; FIG. 3 illustrates a top view of the wheel assembly of the projection device according to FIG. 1; and FIG. 4 illustrates a side view of the wheel assembly of the projection device according to FIG. 1. As shown in FIGS. 2-4, the wheel assembly 100 of this embodiment includes a housing 101, a wheel 110, and at least one thermal conductive assembly 120; the figures exemplarily illustrate only one thermal conductive assembly. Interior of the housing 101 forms an enclosure S, and the wheel 110 is disposed within the enclosure S of the housing 101. The enclosure S may be an air-tight enclosure for preventing dust particles outside of the housing 101 from entering the housing 101 and adhering to the wheel 110.

More specifically, the wheel 110 includes a first surface 112, a second surface 114, and a wavelength conversion layer 116. The first surface 112 forms a coating area 113; the second surface 114 is opposite to the first surface 112; and the wavelength conversion layer 116 is formed on the coating area 113 of the first surface 112. The wavelength conversion layer 116 converts the wavelength of the light beam 20 emitted by the light emitter 102 (as illustrated in FIG. 1). The driver 103 may be disposed on the second surface 114 of the wheel 110; but the invention is not limited thereto. In this embodiment, the wheel 110 may be a metal wheel; more specifically, material of the wheel 110 may be, but not limited to, stainless steel, aluminum, copper, or other rigid materials with high thermal conductivity. Additionally, the first surface 112 of the wheel 110 may be coated with an optional reflective material for reflecting the wavelength converted light beam converted by the wavelength conversion layer 116 from the light beam 20 emitted by light emitter 102; however, the invention is not limited thereto.

In this embodiment, the coating area 113 of the first surface 112 may include an optional through hole 113a for a portion of the light beam 20 to pass through. The through hole 113a may, but may not limited to, fit in an optional glass sheet or other transparent sheets. When the driver 103 drives the wheel 110 to rotate, the area of light exposure of the wavelength conversion layer 116 may increase as the wheel 110 rotates. In this embodiment, the coating area 113 may be formed along the outer edge 112a of the first surface 112; the invention is not limited thereto. The wavelength conversion layer 116 may include a first wavelength conversion material 116a and a second wavelength conversion material 116b, for converting the light beam 20 into a first wavelength converted light beam and a second wavelength converted light beam, respectively. The wavelength conversion layer 116 may not be made of precisely two wavelength conversion materials; in other embodiments, the wavelength conversion layer 120 may include more than three wavelength conversion materials or may include only one wavelength conversion material. The wavelength conversion layer 116 may be formed with phosphor powder or quantum dot phosphor powder, and the first wavelength conversion material 116a and the second wavelength conversion material 116b may be phosphor powder of different colors, thus generating light beams with different colors upon excitation of the light beam 20; however, the invention is not limited thereto. For example, if the light emitter 102 is a blue laser diode light source, the light beam 20 is a blue laser; and the first wavelength conversion material 116a of the wavelength conversion layer 116 may be a green phosphor powder while the second wavelength conversion material 116b may be a yellow phosphor powder.

As shown in FIG. 4, the thermal conductive assembly 120 of this embodiment includes a thermal conductive structure 122 and a thermal conductive tube 124. At least partial of the thermal conductive structure 122 corresponds to the edge contour of the wheel 110 and is disposed adjacent to the outer edge of the wheel 110. The edge contour is the external shape of a component; for example, the edge contour of the wheel 110 of the embodiment is circular.

The thermal conductive tube 124 is coupled to the thermal conductive structure 122. At least partial of the thermal conductive tube 124 protrudes to the exterior of the housing 101, for conducting heat generated by the wheel 110 to the thermal conductive structure 122 and thus to the exterior of the housing 101. More specifically, when the wheel 110 rotates, the wheel 110 would drive the surrounding air and generate an airflow flowing outwards from the shaft of the wheel 110 (not illustrated in figure). Direction of the airflow may be parallel to the first surface 112 or the second surface 114 of the wheel 110, and may shift according to the direction of rotation, such as clockwise or counterclockwise, of the wheel 110. The airflow can carry energy generated from light conversion loss and heat generated by the driver 103 away from the wheel 110. When the airflow flows out to the exterior of the wheel 110 and contacts the thermal conductive structure 122, heat moving along with the airflow can be conducted to the thermal conductive structure 122 and thus the thermal conductive tube 124. As at least partial of the thermal conductive tube 124 protrudes to the exterior of the housing 101, two ends of the thermal conductive tube 124 locating in the interior and at the exterior of the housing 101 respectively would have different temperatures; therefore, the energy and heat moving along with the airflow can be carried to the exterior of the housing 101 by being conducted to the thermal conductive structure 122, thus to the thermal conductive tube 124, and finally to the end of the thermal conductive tube 124 having a lower temperature; that is, the exterior of the housing 101. In this embodiment, the thermal conductive tube 124 may be a metal tube made of silver, copper, or aluminum; and may be a solid tube or a hollow tube. Furthermore, a portion of the thermal conductive tube 124 may correspond to the edge contour of the wheel 110 and be disposed adjacent to the outer edge of the wheel 110; however, the invention is not limited thereto.

In some embodiments, the wheel assembly 100 may dispose an optional fan 130 (as illustrated in FIG. 3). The fan may be disposed inside of the housing 101 and direct the surrounding air to flow towards the shaft of the wheel 110, so that the volume of airflow rotatably flowing outwards from the shaft of the wheel 110 during rotation of the wheel 110 may increase and the capacity of the airflow in dissipating energy generated from light conversion loss and heat generated by the driver 103 may thus improve. For example, the fan 130 may be, but not limited to, an axial fan, a centrifugal fan, an ion fan, or other suitable fans. Additionally, in this embodiment, the thermal conductive assembly 120 may further include a thermal dissipative structure 126 disposed on the thermal conductive tube 124 and at the exterior of the housing 101, for increasing the area of the thermal conductive assembly 120 in contact with external air and thus enhancing the thermal dissipative capacity. For example, the thermal dissipative structure 126 may be a plurality of thermal dissipative sheets 127; more specifically, material of the thermal dissipative sheets 127 may be aluminum or copper; the invention is not limited thereto.

Likewise, the thermal conductive structure 122 may further include a plurality of thermal conductive sheets 123. The thermal conductive sheets 123 are disposed at intervals on the thermal conductive tube 124, so as to form a plurality of gaps 123a (as illustrated in FIG. 4). An end of each of the gaps 123a is adjacent to the outer edge of the wheel 110; airflow carried along with the rotation of the wheel 110 can flow through the gaps 123a and thoroughly contact the two opposite surfaces of each of the thermal conductive sheets 123, thus thoroughly conducting heat to the thermal conductive sheets 123. It is to be understood that the thermal conductive structure 122 may also be thermal conductive tube components disposed at intervals on the thermal conductive tube 124. The intervals between each of the gaps 123a may be, but not limited to, regular or at least partially irregular.

The distance $d_1$ (as illustrated in FIG. 3) between the thermal conductive structure 122 and the outer edge 112a of the first surface 112 of the wheel 110 may fall within the range of 1 mm to 50 mm; the invention is not limited thereto. For example, when a thermal conductive assembly is not disposed adjacent to the wheel assembly 120, temperature of the wheel 110 measured during rotation of the wheel 110 is about 177° C.; however, when the distance $d_1$ between the thermal conductive structure 122 and the outer edge 112a of the wheel 110 is 5.8 mm, temperature of the wheel 110 would become about 166° C.; when the distance $d_1$ is 3.7 mm, the wheel 110 would be about 163° C.; and when the distance $d_1$ is reduced to 2.0 mm, temperature of the wheel 110 would be lowered to 162° C. That is, temperature of the wheel 110 during rotation may be reduced by about 15° C. as compared with that in a wheel assembly 100 without a thermal conductive assembly 120. Consequently, the distance $d_1$ between the thermal conductive structure 122 and the outer edge 112a of the first surface 112 of the wheel 110 is preferably within the ranges of 1 mm-2 mm, 1 mm-3.7 mm, 1 mm-5.8 mm, 2 mm-3.7 mm, 2 mm-5.8 mm, 3.7 mm-5.8 mm, 2 mm-50 mm, 3.7 mm-50 mm, or 5.8 mm-50 mm.

Figure 5:
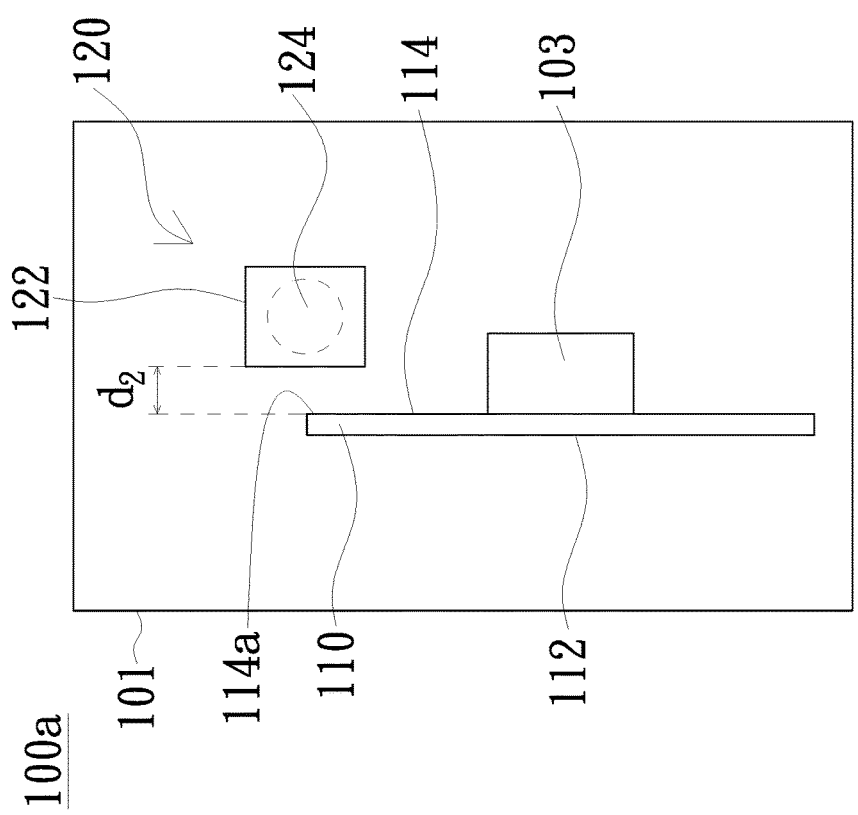
FIG. 5 is a schematic illustration of another embodiment of the wheel assembly according to FIG. 1.

Referring to FIG. 5, which illustrates another embodiment of the wheel assembly according to FIG. 1. The wheel assembly 100a shown in FIG. 5 is similar to the aforementioned wheel assembly 100; therefore, identical components are referred to by the same reference characters and are thus not repeated herein. As compared with wheel assembly 100, the thermal conductive structure 122 of wheel assembly 100a faces the second surface 114 of the wheel 110, and at least partial of the thermal conductive structure 122 corresponds to the edge contour of the second surface 114 and is disposed adjacent to the outer edge 114a of the second surface 114. The distance $d_2$ between the thermal conductive structure 122 and the outer edge 114a of the second surface 114 falls within the range of 1 mm to 50 mm, but the invention is not limited thereto. In other embodiments, the distance $d_2$ may be within the ranges of 1 mm-2 mm, 1 mm-3 7 mm, 1 mm-5.8 mm, 2 mm-3.7 mm, 2 mm-5.8 mm, 3.7 mm-5.8 mm, 2 mm-50 mm, 3.7 mm-50 mm, or 5.8 mm-50 mm.

Figure 6:
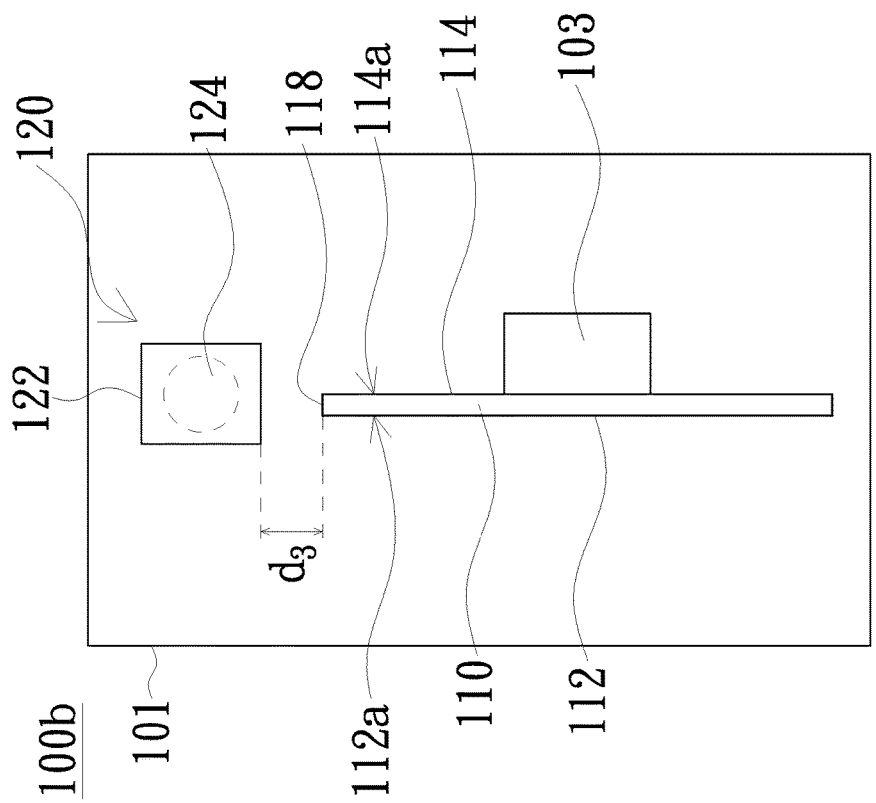
FIG. 6 is a schematic illustration of yet another embodiment of the wheel assembly according to FIG. 1.

Referring to FIG. 6, which illustrates yet another embodiment of the wheel assembly according to FIG. 1. The wheel assembly 100b shown in FIG. 6 is similar to the aforementioned wheel assemblies 100 and 100a; therefore, identical components are referred to by the same reference characters and are thus not repeated herein. As compared with wheel assemblies 100 and 100a, the wheel assembly 100b of the wheel 110 includes a side wall 118. The side wall 118 is disposed between the first surface 112 and the second surface 114, and surrounds the outer edge 112a of the first surface 112 and the outer edge 114a of the second surface 114. The thermal conductive structure 122 may face the side wall 118, and at least partial of the thermal conductive structure 122 corresponds to the edge contour of the side wall 118 and is disposed adjacent to the side wall 118. The distance $d_3$ between the thermal conductive structure 122 and the side wall 118 falls within the range of 1 mm to 50 mm, but the invention is not limited thereto. In other embodiments, the distance $d_3$ may be within the ranges of 1 mm-2 mm, 1 mm-3.7 mm, 1 mm-5.8 mm, 2 mm-3 7 mm, 2 mm-5.8 mm, 3.7 mm-5.8 mm, 2 mm-50 mm, 3.7 mm-50 mm, or 5.8 mm-50 mm.

Figure 7:
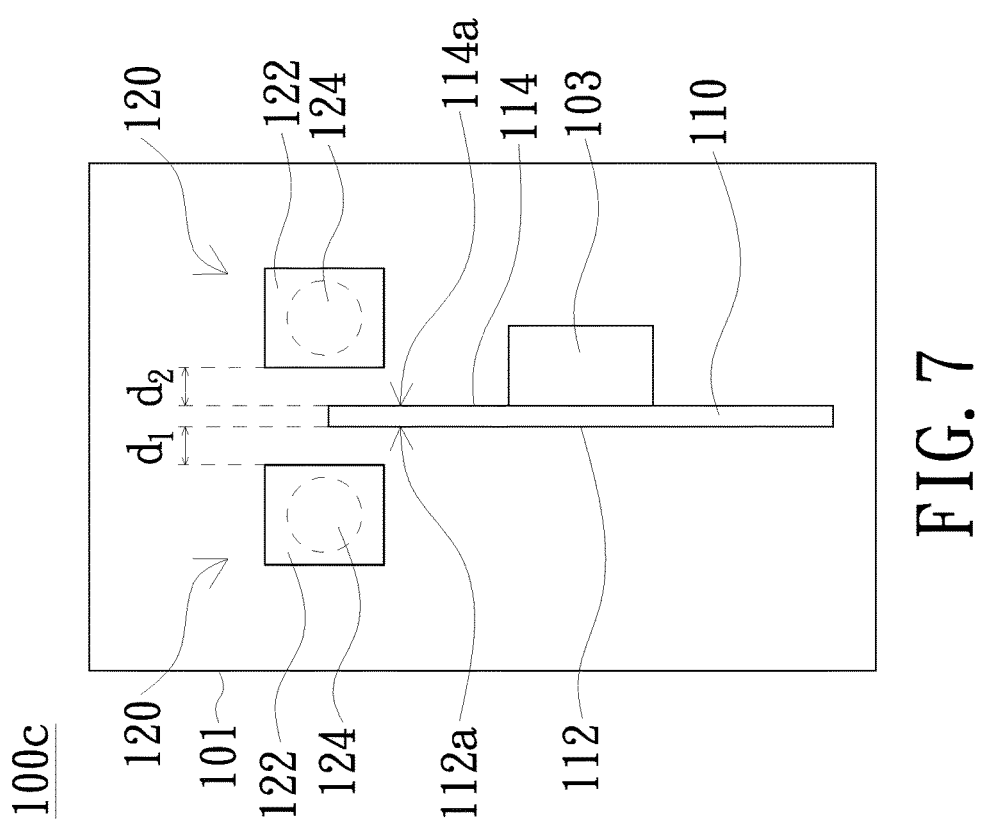
FIG. 7 is a schematic illustration of still another embodiment of the wheel assembly according to FIG. 1.

Referring to FIG. 7, which illustrates still another embodiment of the wheel assembly according to FIG. 1. The wheel assembly 100c shown in FIG. 7 is similar to the aforementioned wheel assemblies 100-100b; therefore, identical components are referred to by the same reference characters and are thus not repeated herein. As compared with wheel assemblies 100-100b, the wheel assembly 100c includes two thermal conductive assemblies 120 disposed on the first surface 112 and the second surface 114 of the wheel 110, respectively. The distance $d_1$ between the thermal conductive structure 122 adjacent to the first surface 112 and the outer edge 112a of the first surface 112 falls within the range of 1 mm to 50 mm; and the distance $d_2$ between the thermal conductive structure 122 adjacent to the second surface 114 and the outer edge 114a of the second surface 114 also falls within the range of 1 mm to 50 mm; however, the invention is not limited thereto. In other embodiments, the distances $d_1$ and $d_2$ may be within the ranges of 1 mm-2 mm, 1 mm-3.7 mm, 1 mm-5.8 mm, 2 mm-3.7 mm, 2 mm-5.8 mm, 3.7 mm-5.8 mm, 2 mm-50 mm, 3.7 mm-50 mm, or 5.8 mm-50 mm. Furthermore, in this embodiment, the thermal conductive structures 122 of the two thermal conductive assemblies 120 may be, but may not be limited to, positioned opposite of each other.

Figure 8:
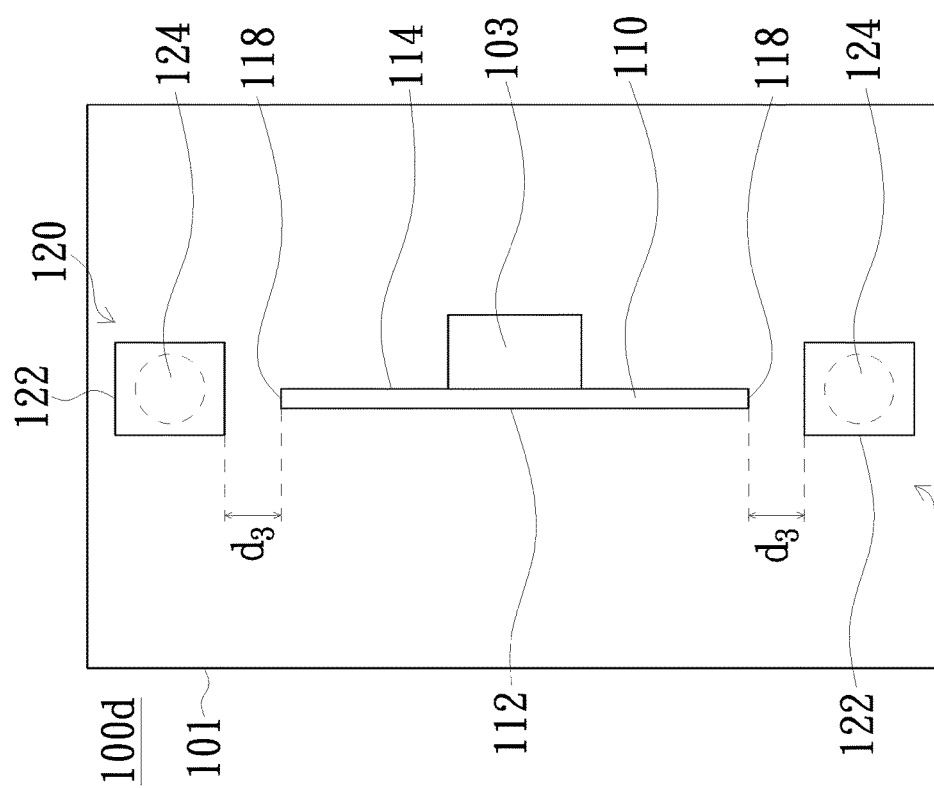
FIG. 8 is a schematic illustration of still another embodiment of the wheel assembly according to FIG. 1.

Referring to FIG. 8, which illustrates still another embodiment of the wheel assembly according to FIG. 1. The wheel assembly 100d shown in FIG. 8 is similar to the aforementioned wheel assemblies 100-100c; therefore, identical components are referred to by the same reference characters and are thus not repeated herein. As compared with wheel assemblies 100-100c, the wheel assembly 100d includes two thermal conductive assemblies 120; thermal conductive structures 122 of the two thermal conductive assemblies 120 faces the side wall 118 and are disposed on the two opposite ends of the wheel 110, respectively. Meanwhile, at least partial of the thermal conductive structures 122 correspond to the edge contour of the side wall 118 and are disposed adjacent to the side wall 118. In this embodiment, the distance $d_3$ between the thermal conductive structure 122 and the side wall 118 falls within the range of 1 mm to 50 mm; but the invention is not limited thereto. In other embodiments, the distance $d_3$ may be within the ranges of 1 mm-2 mm, 1 mm-3.7 mm, 1 mm-5.8 mm, 2 mm-3.7 mm, 2 mm-5.8 mm, 3.7 mm-5.8 mm, 2 mm-50 mm, 3.7 mm-50 mm, or 5.8 mm-50 mm.

Figure 9:
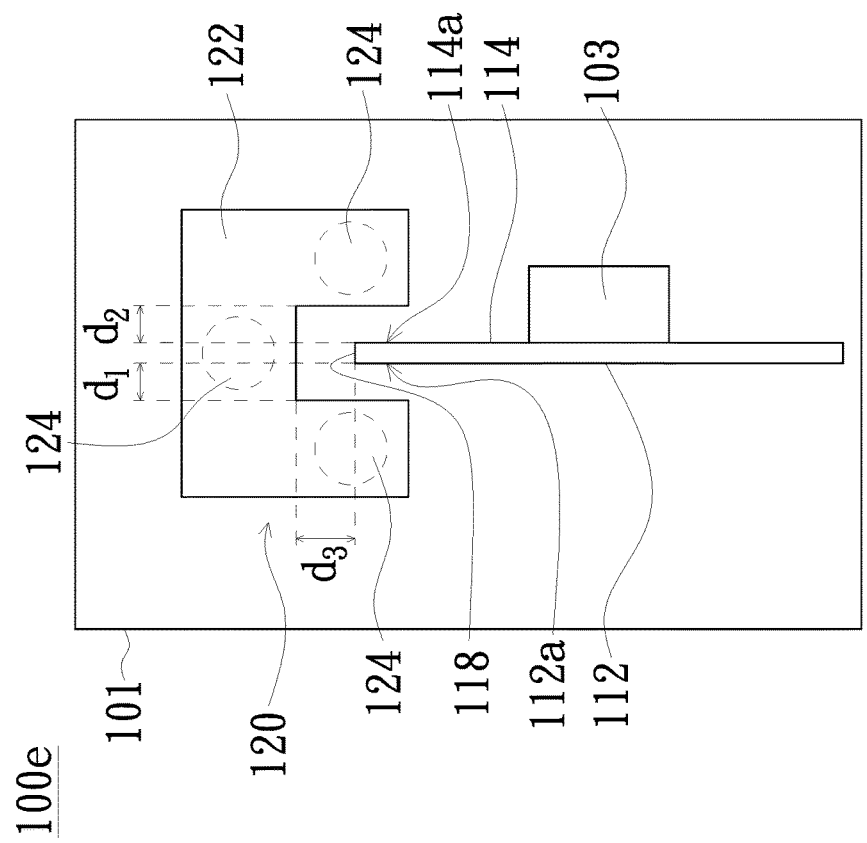
FIG. 9 is a schematic illustration of still another embodiment of the wheel assembly according to FIG. 1.

Referring to FIG. 9, which illustrates still another embodiment of the wheel assembly according to FIG. 1. The wheel assembly 100e shown in FIG. 9 is similar to the aforementioned wheel assemblies 100-100d; therefore, identical components are referred to by the same reference characters and are thus not repeated herein. As compared with wheel assemblies 100-100d, thermal conductive assemblies of the wheel assembly 100e are disposed on the first surface 112, the second surface 114, and the side wall 118 of the wheel 110; and are distances $d_1$, $d_2$, and $d_3$ away from the first surface 112 and the second surface 114. The distances $d_1$, $d_2$, and $d_3$ fall within the range of 1 mm to 50 mm; but the invention is not limited thereto. In other embodiments, the distances $d_1$, $d_2$, and $d_3$ may be within the ranges of 1 mm-2 mm, 1 mm-3.7 mm, 1 mm-5.8 mm, 2 mm-3.7 mm, 2 mm-5.8 mm, 3.7 mm-5.8 mm, 2 mm-50 mm, 3.7 mm-50 mm, or 5.8 mm-50 mm. It is to be understood that while three thermal conductive tubes 124 are exemplarily illustrated in this embodiment, the invention is not limited thereto. The number of thermal conductive tube 124 may be one or two, and may also be more than four.

Figure 10C:
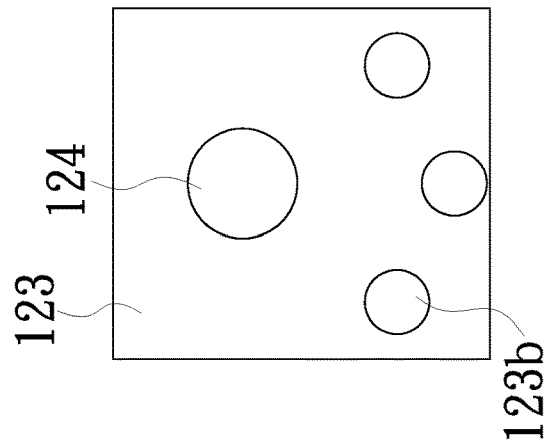
FIGS. 10A-10C are schematic illustrations of three thermal conductive sheets of the thermal conductive assembly of the wheel assembly of the invention.
Figure 10B:
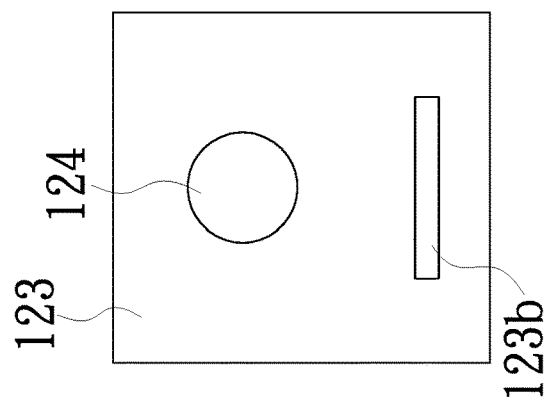
Figure 10A:
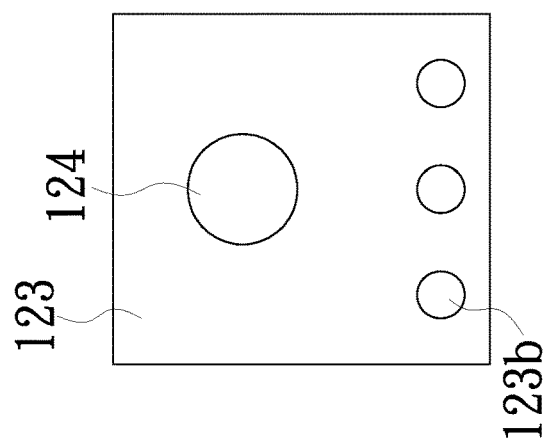

Referring to FIGS. 10A-10C, FIGS. 10A-10C illustrate three thermal conductive sheets of the thermal conductive assembly of the wheel assembly of the invention. In this embodiment, an end of at least partial of the thermal conductive sheets 123 adjacent to the wheel 110, such as the lower end of thermal conductive sheets 123 illustrated in FIGS. 10A-10C, includes a plurality of openings 123b. The openings 123b may reduce the hindrance to aerial flow of the airflow generated by the wheel 110 during rotation when contacting the thermal conductive sheets 123 and may enhance the effectiveness of thermal exchange.

For example, in this embodiment, the shape of at least partial of the openings 123b of the thermal conductive sheet 123 may be circular, as shown in FIG. 10A, or rectangular, as shown in FIG. 10B. Additionally, at least partial of the openings 123b may be arranged on the end of the thermal conductive sheet 123 adjacent to the wheel 110 in the form of an array, as shown in FIG. 10C. However, it is to be understood that the invention is not limited thereto.

Figure 11B:
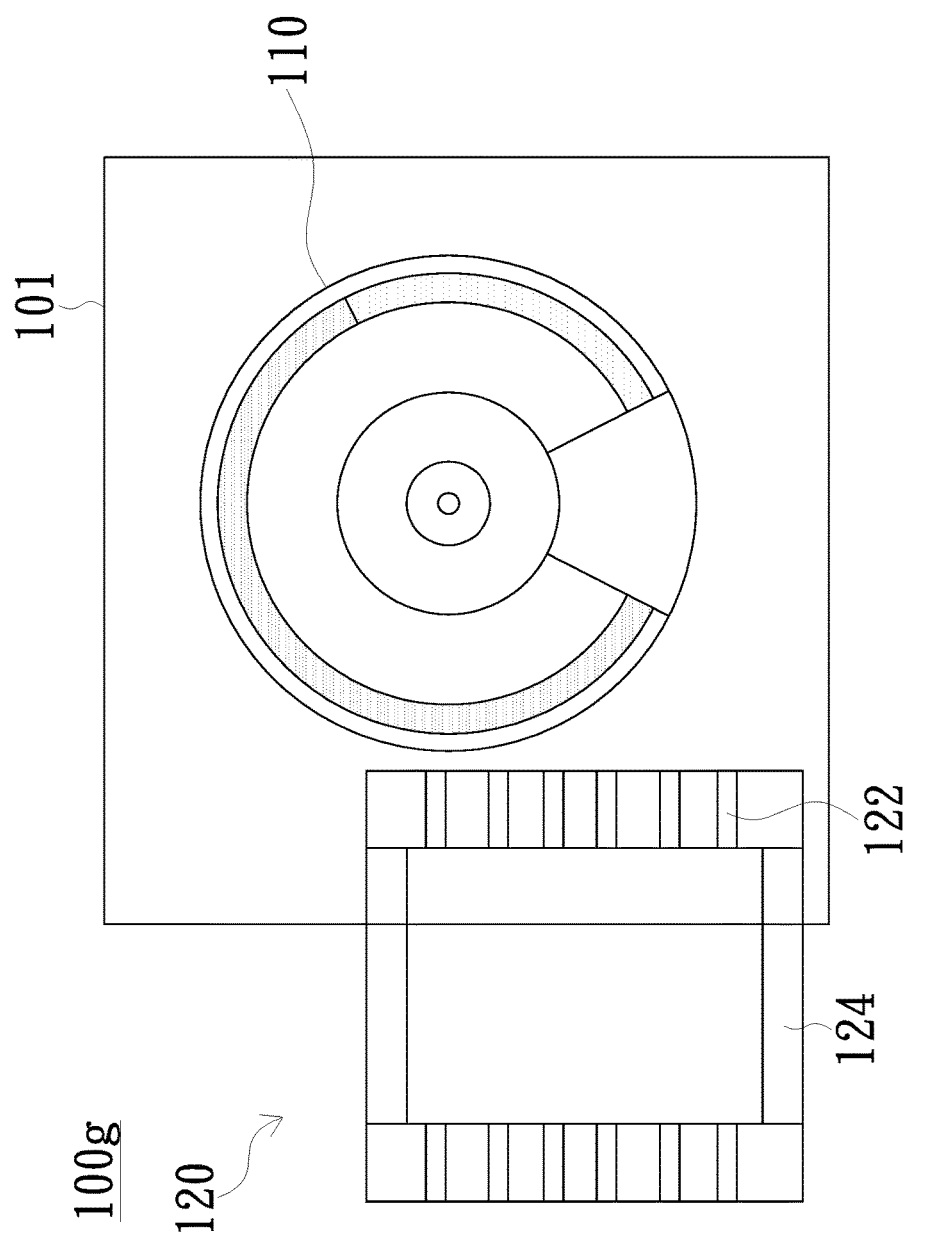
FIG. 11B is a schematic illustration of yet another embodiment of the wheel assembly of the projection device according to FIG. 1.

Referring to FIGS. 11A and 11B. FIG. 11A illustrates another embodiment of the wheel assembly of the projection device according to FIG. 1; and FIG. 11B illustrates yet another embodiment of the wheel assembly of the projection device according to FIG. 1. The wheel assemblies 100f and 100g shown in FIGS. 11A and 11B are similar to the aforementioned wheel assemblies 100-100d; therefore, identical components are referred to by the same reference characters and are thus not repeated herein. The thermal conductive tubes 124 of the wheel assemblies 100f and 100g are of different types than those of the wheel assemblies 100-100d. As shown in FIG. 11A, the thermal conductive tube 124 of the wheel assembly 100f partially protrudes over an annular tube at the exterior of the housing 101; and the portion of the thermal conductive tube 124 outside of the housing 101 may further dispose a thermal dissipative structure 126. Under such setting, temperature difference between the thermal conductive structure 122 of the thermal conductive assembly 120 inside of the housing 101 and the thermal conductive tube 124 outside of the housing 101 during rotation of the wheel 110 may be further increased and thus enhancing the efficiencies of thermal conductivity and thermal dissipation of the thermal assembly 120.

As shown in FIG. 11B, in yet another embodiment, the thermal conductive tube 124 may include a coolant (not illustrated). The coolant may be water or a refrigerant, and may fluidically fill the interior of the thermal conductive tube 124. As such, temperature difference between the thermal conductive structure 122 of the thermal conductive assembly 120 inside of the housing 101 and the thermal conductive tube 124 during rotation of the wheel 110 may be increased and thus enhancing the efficiencies of thermal conductivity and thermal dissipation of the thermal assembly 120. The coolant may be pressured to flow within the thermal conductive tube 124 by using a pump (not illustrated), but the invention is not limited thereto.

In sum, the wheel assembly of the projection device of the embodiments of the invention has a thermal conductive assembly disposed adjacent to the outer edge of the wheel, so that energy generated from light conversion loss and heat generated during rotation of the wheel of the wheel assembly may be conducted to the thermal conductive assembly along with the airflow flowing away from the wheel. The energy and heat are then conducted to the exterior of the housing of the wheel assembly via the thermal conductive tube of the thermal conductive assembly, so as to lower the temperature at the interior of the housing of the wheel assembly and thus the temperature around the wheel. Temperature of the wheel assembly having the thermal conductive assembly of the invention may be reduced by about 15° C. during wheel rotation as compared with that of wheel assemblies without a thermal conductive assembly.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A wheel assembly comprising:
   a housing, having an enclosure;
   a wheel, disposed within the enclosure of the housing, the wheel comprising:
   a first surface, wherein a coating area is formed on the first surface;
   a second surface, opposite to the first surface; and
   a wavelength conversion layer, formed on the coating area of the first surface and configured to convert a wavelength of a light beam; and
   a thermal conductive assembly, comprising:
   a thermal conductive structure and a thermal conductive tube, wherein at least partial of the thermal conductive structure corresponds to an edge contour of the wheel and is disposed adjacent to an outer edge of the wheel, and the thermal conductive tube is coupled to the thermal conductive structure and at least partial of the thermal conductive tube protrudes to an exterior of the housing for conducting heat generated by the wheel to the exterior of the housing, wherein a distance between the thermal conductive structure and the outer edge of the wheel falls within a range of 1 mm to 50 mm, wherein the thermal conductive structure comprises a plurality of thermal conductive sheets, the thermal conductive sheets are disposed at intervals on the thermal conductive tube, so as to form a plurality of gaps, an end of each of the plurality of gaps is adjacent to the outer edge of the wheel.

2. The wheel assembly according to claim 1, wherein the thermal conductive assembly further comprises a thermal dissipative structure, disposed on the thermal conductive tube and at the exterior of the housing.

3. The wheel assembly according to claim 1, wherein the thermal conductive structure faces the first surface of the wheel, and at least partial of the thermal conductive structure corresponds to the edge contour of the first surface and is disposed adjacent to the outer edge of the first surface, the distance between the thermal conductive structure and the outer edge of the first surface falls within the range of 1 mm to 50 mm.

4. The wheel assembly according to claim 1, wherein the thermal conductive structure faces the second surface of the wheel, and at least partial of the thermal conductive structure corresponds to the edge contour of the second surface and is disposed adjacent to the outer edge of the second surface, the distance between the thermal conductive structure and the outer edge of the second surface falls within the range of 1 mm to 50 mm.

5. The wheel assembly according to claim 1, wherein the wheel further comprises a side wall, the side wall is disposed between the first surface and the second surface and surrounds the outer edge of the first surface and the outer edge of the second surface, the thermal conductive structure faces the side wall, and at least partial of the thermal conductive structure corresponds to the edge contour of the side wall and is disposed adjacent to the side wall, the distance between the thermal conductive structure and the side wall falls within the range of 1 mm to 50 mm.

6. The wheel assembly method according to claim 1, wherein an end of at least partial of the plurality of thermal conductive sheets adjacent to the wheel comprises a plurality of openings.

7. The wheel assembly according to claim 6, wherein a shape of at least partial of the plurality of openings is circular or rectangular.

8. The wheel assembly according to claim 6, wherein at least partial of the plurality of openings are arranged on the plurality of thermal conductive sheets in a form of an array.

9. The wheel assembly according to claim 1, wherein the thermal conductive tube partially protrudes over an annular tube at the exterior of the housing.

10. The wheel assembly according to claim 1, wherein the thermal conductive tube comprises a coolant, fluidically filling an interior of the thermal conductive tube.

11. A projection device, comprising:
a light emitter, configured to emit a light beam;
a wheel assembly, disposed on an transmission path of the light beam, the wheel assembly comprising:
a housing, having an enclosure;
a wheel, disposed within the enclosure of the housing, the wheel comprising:
a first surface, wherein a coating area is formed on the first surface;
a second surface, opposite to the first surface; and
a wavelength conversion layer, formed on the coating area of the first surface and configured to convert wavelength of the light beam; and
a thermal conductive assembly comprising:
a thermal conductive structure and a thermal conductive tube, wherein at least partial of the thermal conductive structure corresponds to an edge contour of the wheel and is disposed adjacent to an outer edge of the wheel, and the thermal conductive tube is coupled to the thermal conductive structure and at least partial of the thermal conductive tube protrudes to an exterior of the housing for conducting heat generated by the wheel to the exterior of the housing, wherein a distance between the thermal conductive structure and the outer edge of the wheel falls within a range of 1 mm to 50 mm, wherein the thermal conductive structure comprises a plurality of thermal conductive sheets, the thermal conductive sheets are disposed at intervals on the thermal conductive tube, so as to form a plurality of gaps, an end of each of the plurality of gaps is adjacent to the outer edge of the wheel;
a driver, assembled to the wheel of the wheel assembly and configured to drive a rotation of the wheel;
a light valve, disposed on the transmission path of the light beam and configured to modulate the light beam converted by the wavelength conversion layer into an image bearing light beam; and
a projection lens, disposed on the transmission path of the image bearing light beam so as to project the image bearing light beam.

12. The projection device according to claim 11, wherein the thermal conductive assembly further comprises a thermal dissipative structure, disposed on the thermal conductive tube and at the exterior of the housing.

13. The projection device according to claim 11, wherein the thermal conductive structure faces the first surface of the wheel, and at least partial of the thermal conductive structure corresponds to the edge contour of the first surface and is disposed adjacent to the outer edge of the first surface, the distance between the thermal conductive structure and the outer edge of the first surface falls within the range of 1 mm to 50 mm.

14. The projection device according to claim 11, wherein the thermal conductive structure faces the second surface of the wheel, and at least partial of the thermal conductive structure corresponds to the edge contour of the second surface and is disposed adjacent to the outer edge of the second surface, the distance between the thermal conductive structure and the outer edge of the second surface falls within the range of 1 mm to 50 mm.

15. The projection device according to claim 11, wherein the wheel further comprises a side wall, the side wall is disposed between the first surface and the second surface and surrounds the outer edge of the first surface and the outer edge of the second surface, the thermal conductive structure faces the side wall, and at least partial of the thermal conductive structure corresponds to the edge contour of the side wall and is disposed adjacent to the side wall, the distance between the thermal conductive structure and the side wall falls within the range of 1 mm to 50 mm.

16. The projection device according to claim 11, wherein an end of at least partial of the plurality of thermal conductive sheets adjacent to the wheel comprises a plurality of openings.

17. The projection device according to claim 16, wherein a structure of at least partial of the plurality of openings is circular or rectangular.

18. The projection device according to claim 17, wherein at least partial of the plurality of openings are arranged on the plurality of thermal conductive sheets in a form of an array.

19. The projection device according to claim 11, wherein the thermal conductive tube partially protrudes over an annular tube at the exterior of the housing.

20. The projection device according to claim 11, wherein the thermal conductive tube comprises a coolant, fluidically filling an interior of the thermal conductive tube.

\* \* \* \* \*